(12) United States Patent
Kaushik et al.

(10) Patent No.: US 11,461,280 B2
(45) Date of Patent: *Oct. 4, 2022

(54) HANDLING METADATA OPERATIONS AND TIMESTAMP CHANGES DURING RESYNCHRONIZATION

(71) Applicant: NetApp Inc., Sunnyvale, CA (US)

(72) Inventors: Akhil Kaushik, Bangalore (IN); Krishna Murthy Chandraiah setty Narasingarayanapeta, Bangalore (IN)

(73) Assignee: NetApp Inc., San Jose, CA (US)

( * ) Notice: Subject to any disclaimer, the term of this patent is extended or adjusted under 35 U.S.C. 154(b) by 514 days.

This patent is subject to a terminal disclaimer.

(21) Appl. No.: 16/401,257

(22) Filed: May 2, 2019

(65) Prior Publication Data

US 2020/0050587 A1 Feb. 13, 2020

Related U.S. Application Data

(63) Continuation of application No. 16/191,700, filed on Nov. 15, 2018.

(30) Foreign Application Priority Data

Aug. 9, 2018 (IN) .............................. 201841029907

(51) Int. Cl.
*G06F 16/178* (2019.01)
*G06F 16/27* (2019.01)
(Continued)

(52) U.S. Cl.
CPC ........ *G06F 16/178* (2019.01); *G06F 16/1805* (2019.01); *G06F 16/2358* (2019.01);
(Continued)

(58) Field of Classification Search
CPC .. G06F 16/178; G06F 16/273; G06F 16/1805; G06F 16/275
See application file for complete search history.

(56) References Cited

U.S. PATENT DOCUMENTS 6,820,098 B1 11/2004 Ganesh et al.
7,284,150 B2 10/2007 Ma et al.
(Continued)

OTHER PUBLICATIONS

Int. Search Report/Written Opinion cited in PCT Application No. PCT/US2019/045602 dated Dec. 3, 2019, 30 pgs.
(Continued)

*Primary Examiner* — Amanda L Willis
(74) *Attorney, Agent, or Firm* — Cooper Legal Group, LLC

(57) ABSTRACT

Techniques are provided for resynchronizing a synchronous replication relationship. Asynchronous incremental transfers are performed to replicate data of a storage object to a replicated storage object. Incoming write requests, targeting the storage object, are logged into a dirty region log during a last asynchronous incremental transfer. Metadata operations, executed on the storage object, are logged into a metadata log during the last asynchronous incremental transfer. Sequence numbers are assigned to the metadata operations based upon an order of execution. The metadata operations are replicated to the replicated storage object for execution according to the sequence numbers, and the dirty regions are replicated to the replicated storage object in response to the metadata operations having been replicated to the replicated storage object. The storage object and replicated storage object are transitioned to a synchronous replication state where incoming operations are synchronously replicated to the replicated storage object.

20 Claims, 6 Drawing Sheets

(51) Int. Cl.
*G06F 16/23* (2019.01)
*G06F 16/18* (2019.01)

(52) U.S. Cl.
CPC ............ *G06F 16/27* (2019.01); *G06F 16/273* (2019.01); *G06F 16/275* (2019.01)

(56) References Cited

U.S. PATENT DOCUMENTS

| | | |
|---|---|---|
| 7,386,664 B1 | 6/2008 | Roy et al. |
| 7,606,841 B1 | 10/2009 | Ranade |
| 8,086,569 B2 | 12/2011 | Jasrasaria et al. |
| 8,271,447 B1 | 9/2012 | Natanzon et al. |
| 8,341,115 B1* | 12/2012 | Natanzon ............ G06F 11/2071 707/613 |
| 8,799,222 B2 | 8/2014 | Marathe et al. |
| 8,825,972 B1 | 9/2014 | Tsaur et al. |
| 9,251,021 B2 | 2/2016 | Calder et al. |
| 9,591,073 B2 | 3/2017 | Day et al. |
| 9,720,752 B2 | 8/2017 | Mu et al. |
| 9,917,896 B2 | 3/2018 | Powell et al. |
| 9,936,013 B2 | 4/2018 | Mu et al. |
| 9,977,716 B1 | 5/2018 | Payne et al. |
| 10,019,502 B2 | 7/2018 | Shetty et al. |
| 2007/0162516 A1* | 7/2007 | Thiel ..................... G06F 16/273 |
| 2011/0099342 A1* | 4/2011 | Ozdemir ............. G06F 11/2074 711/162 |
| 2017/0091299 A1 | 3/2017 | Ngan et al. |
| 2017/0154093 A1* | 6/2017 | Shetty ................... G06F 16/275 |
| 2017/0220258 A1 | 8/2017 | Kaushik et al. |
| 2017/0277709 A1* | 9/2017 | Strauss ................. G06F 3/0604 |
| 2017/0315874 A1 | 11/2017 | Patnaik et al. |
| 2019/0311049 A1* | 10/2019 | Bhargava M R ..... G06F 16/166 |
| 2020/0050687 A1 | 2/2020 | Kaushik et al. |

OTHER PUBLICATIONS techterms.com: "Inode Definition," 2019, Reprinted from the Internet at: https://techterms.com/definition/inode, 3 pages.

* cited by examiner

– continued –

HANDLING METADATA OPERATIONS AND TIMESTAMP CHANGES DURING RESYNCHRONIZATION

RELATED APPLICATIONS

This application claims priority to and is a continuation of U.S. patent application Ser. No. 16/191,700, titled "RESYNCHRONIZATION TO A SYNCHRONOUS REPLICATION RELATIONSHIP" and filed on Nov. 15, 2018, which claims priority to India Patent Application, titled "RESYNCHRONIZATION TO A SYNCHRONOUS REPLICATION RELATIONSHIP", filed on Aug. 9, 2018 and accorded Indian Application No.: 201841029907, which are incorporated herein by reference.

BACKGROUND

Many storage systems may implement data replication and/or other redundancy data access techniques for data loss protection and non-disruptive client access. For example, a first computing device may be configured to provide clients with primary access to data stored within a first storage device and/or other storage devices. A second computing device may be configured as a backup for the first computing device in the event the first computing device fails. Data may be replicated from the first computing device to the second computing device. In this way, the second computing device can provide clients with access to replicated data in the event the first computing device fails.

One type of replication is asynchronous replication. When the first computing device receives an operation from a client device, the first computing device transmits a replication of the operation to the second computing device for execution. Irrespective of whether the second computing device has executed the replicated operation, the first computing device will transmit an acknowledgment of successful performance of the operation to the client device once the first computing device has executed the operation.

Another type of replication is synchronous replication, which provides a greater level of data protection guarantees. This is because the first computing device does not transmit the acknowledgment until the operation has been executed by the first computing device and the replication operation has been executed or acknowledged by the second computing device. In this way, two copies of data and/or metadata resulting from the operation are maintained before the client receives acknowledgment that the operation was successful.

Unfortunately, the first computing device and the second computing device can fall out of sync due to network transmission errors, computer failures, and/or other issues that will cause data maintained by the first computing device to diverge from replicated data maintained by the second computing device. Thus, the data protection guarantees provided by synchronous replication cannot be provided until storage of the first computing device and the second computing device are brought back into a synchronous replication state. Current resynchronization processes can be very disruptive to clients because client operations will be quiesced (e.g., client I/O operations will be blocked, failed, stopped, or queued for later execution) during various phases of resynchronization. Blocking client I/O can cause applications to time out, experience errors, increase client experienced latency, and disrupt access to data.

DETAILED DESCRIPTION

Figure 1:
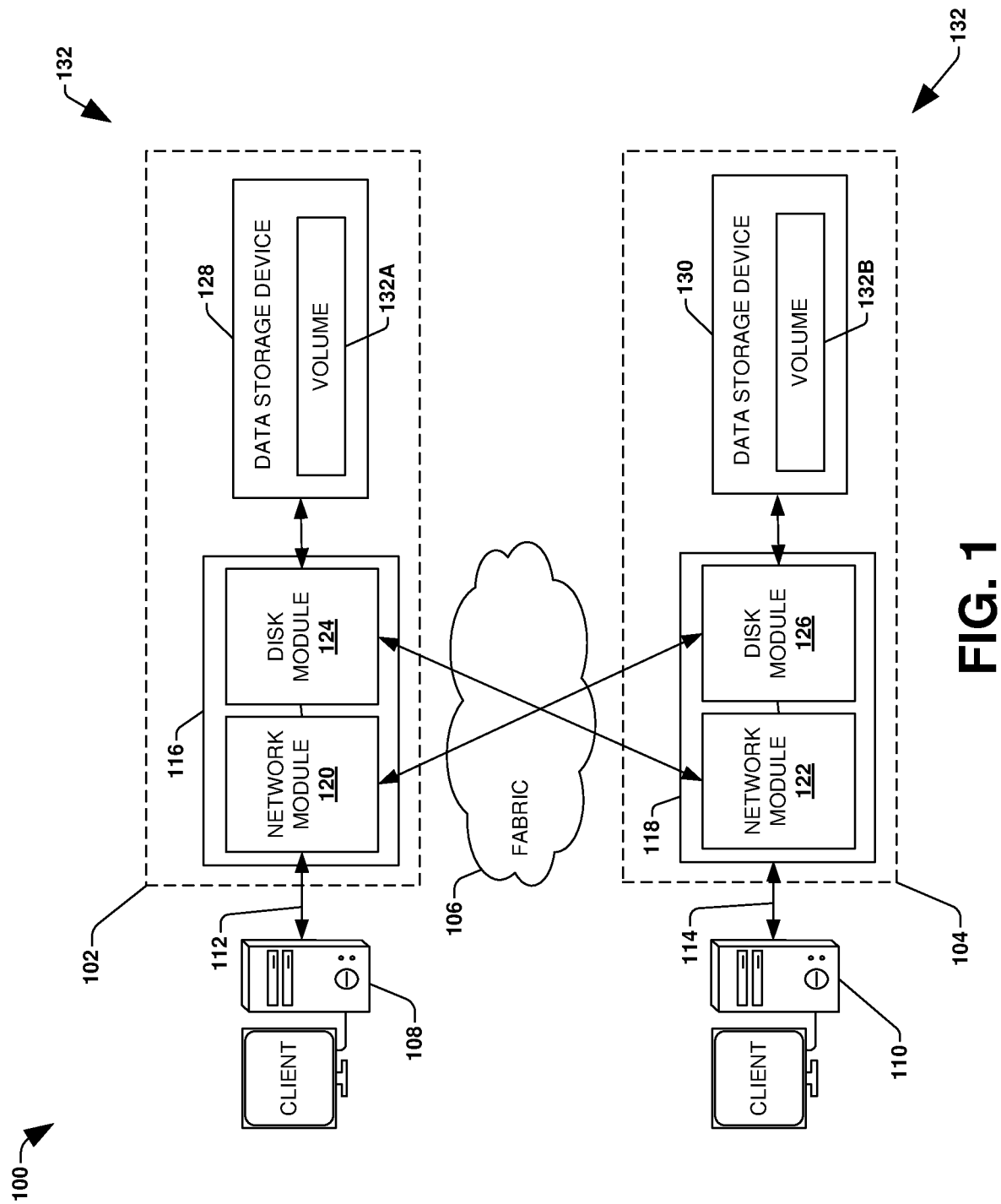
FIG. 1 is a component block diagram illustrating an example clustered network in which an embodiment of the invention may be implemented.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

In asynchronous replication, incremental changes to a storage object, such as a volume, a file, a directory, a defined set of files or directories, a file system, or a storage virtual machine comprising a plurality of volumes stored across one or more nodes of a cluster, are replicated from the storage object to a replicated storage object. In synchronous replication, when an operation is received from a client device (e.g., a write operation targeting the storage object), the operation is split to create a replicated operation that is a replication of the operation. The operation is executed upon the storage object, such as by a first computing device managing the storage object. The replicated operation is executed upon the replicated storage object, such as by a second computing device managing the replicated storage object. The operation is not acknowledged to the client device as being complete until both the operation and the replicated operation have successfully been executed upon the storage object and the replicated storage object.

Synchronous replication can be implemented for a new volume in a relatively easy manner. This is because there are no pending client I/O, making real-time changes and modifications to the new volume, that need to be dealt with in order to make a replicated volume of the new volume consistent with the new volume. These pending I/O would otherwise need to be handled so that the new volume and the replicated volume have the same data as a baseline for starting to synchronously replicate new incoming client I/O.

However, for an existing volume that already comprises data that is being actively modified in real-time by incoming client I/O, a replicated volume will have to be brought into sync with respect to the existing volume so that the replicated volume has the same data as the existing volume. Because the existing volume is used to actively process client I/O, the replicated volume will lag behind the existing volume due to the client I/O modifying the existing volume. Thus, conventional techniques for transitioning from asynchronous replication to synchronous replication must pause client I/O (e.g., stop, block, fail, or queue the client I/O for later execution), which increases latency (e.g., increased latency while the client I/O is queued). This also affects the operation of client devices accessing data within the existing volume (e.g., an application may timeout or experience errors when data access operations, attempting to access data, are blocked or failed).

Accordingly, methods and/or systems are provided herein that can transition a storage object from an asynchronous replication state or other non-synchronous state (e.g., an out of sync state) to a synchronous replication state in a manner that mitigates client disruption and latency. That is, the transition (resynchronization) can be performed without holding client I/O (e.g., without pausing, blocking, failing, or queueing for later execution), which reduces client latency that would otherwise be experienced if the client I/O was held during the transition.

A dirty region log is used to track regions within the storage object that are modified by data operations, such as write operations executed during a last asynchronous incremental transfer (e.g., asynchronous incremental transfers may be initially performed to incrementally transfer data from the storage object to a replicated storage object to help make the replicated storage object comprise more of the same data as the storage object). The dirty region log may comprise bits that can be set to either a dirty indicator or a clean indicator. A bit may be mapped to a region within the storage object. Thus, the bit can be set to the dirty indicator to indicate that a data operation has modified the region (e.g., the region now comprises data not yet replicated to the replicated storage object). The bit can be set to the clean indicator to indicate that the region is now clean (e.g., the region has not been modified with data not yet replicated to the replicated storage object, and thus the region comprises the same data as a corresponding region within the replicated storage object).

A metadata log is used to track metadata operations that modify the storage object, such as a create operation (e.g., a create file operation, a create LUN operation, etc.), a link operation, an unlink operation, a rename operation (e.g., a file rename operation, etc.), a set attribute operation (e.g., a set volume size operation, an assign permissions operation, etc.), etc. In particular, copies of metadata operations executed upon the storage object during the last asynchronous transfer are inserted into the metadata log.

The metadata operations within the metadata log are replicated to the replicated storage object according to an order that the metadata operations were executed upon the storage object in order to maintain consistency. In particular, the metadata operations are assigned sequence numbers based upon the order that the metadata operations were executed upon the storage object by the first computing system. The metadata operations are inserted into the metadata log with the sequence numbers. In an embodiment, the metadata operations are sorted within the metadata log based upon the sequence numbers or are inserted into the metadata log based upon the sequence numbers. After the metadata operations are replicated to the second computing device for execution upon the replicated storage object according to the sequence numbers, the dirty regions identified by the dirty region log are replicated from the storage object to the replicated storage object. That is, the data within the dirty regions (e.g., "dirty" data not yet replicated to the replicated storage object) is transmitted to the second computing device for storage into corresponding regions within the replicated storage object. The replication of the dirty region is triggered based upon completion of the replication of the metadata operations.

In an embodiment, dirty region logs are created as incore dirty region logs (e.g., maintained in memory) for each storage object of a consistency group, such as for each file of the consistency group. Also, incore splitter objects (e.g., functionality configured to intercept and replicate operations) are setup for each replication endpoint (e.g., the replicated storage object hosted by the second computing device) and are set to a dirty region logging state. This ensures that incoming client writes are intercepted by the splitter objects, and for each region that is modified by the incoming client writes, dirty bits are set in the dirty region log. Thus, regions that are dirty are captured incore from this point forward. During the cutover phase, the splitter objects are changed to a cut over split state. From this point forward, for every incoming client I/O, a corresponding dirty region log for a target storage object is evaluated. If a write operation targets a dirty region of a storage object, then the write is executed upon the storage object. If a write operation targets a non-dirty or partially dirty region, then data of the write operation is written to the storage object and is split/replicated to a replicated storage object. A cutover scanner may be executed to read the incore dirty region logs. For every dirty region identified, dirty data is replicated to the replicated storage object. During the replication, a lock can be obtained for the dirty region so that any writes to the dirty region are blocked. The lock is removed once the second computing device writes the replicated dirty data to the replicated storage object.

The present system overcomes technical challenges relating to how correctness (e.g., data and metadata consistency) is maintained where metadata operations are replicated before data operations. If metadata operations and write data operations target different storage objects, then there is no correctness issue (e.g., no data or metadata inconsistencies). If metadata operations occur before write data operations, then there is also no correctness issue. If write data operations are followed by metadata operations on a file, then correctness issues would occur. In particular, certain portions (or all) of dirty region log content could be rendered invalid due to subsequent metadata operations on the file. For example, an unlink metadata operation could cause deletion of the file and render all dirty region log content for the file invalid. In another example, a set attribute metadata operation could truncate the file and render a portion of the dirty region log invalid. In these cases, an attempt to read those portions on the source storage object (the file) will fail. As provided herein, the present system ignores such failures and replicates the remainder of valid content. This approach provides data consistency between the source storage object (the file) and a destination storage object (a mirror copy/replica of the file) at the end of the transition to a synchronous replication state. The dirty region log is thus a light weight mechanism to track changes, while the metadata log contains as much detail as an initial operation and occupies a minimal amount of memory.

Further, file/directory timestamp replication is also provided. This type of replication is used to replicate changes made to create times (e.g., a time that a file is created), status change times of a file or directory, a data change times, etc. In this way, the present system provides a lightweight method to track metadata operations during the transition period from asynchronous replication to synchronous replication in order to replicate the metadata operations to the replicated storage object while maintaining file system consistency at the replicated storage object. Also, the present system tracks file and directory timestamp changes in the metadata log during the transition period in order to replicate the file and directory timestamp changes to the replicated storage object.

In an embodiment of timestamp replication and transition state challenges related to such, timestamp changes due to metadata operations are logged into the metadata log. However, timestamp changes due to data operations are not logged into the dirty region log. During a drain of the metadata log, timestamps are replicated to the second computing device (destination) using a push file operation applied at the replicated storage object as part of file system message execution. During a dirty region log scan, timestamps are read from the active file system as part of a file system spin network protocol read message (or any other type of read message). The timestamps are transmitted to the second computing device (destination) as part of a push data operation, and are conditionally applied at the second computing device if the timestamps are higher than timestamps in an inode of the replicated storage object (destination file). In this way, the dirty region log scan will send the latest timestamps as opposed to timestamps at the time of writing. During the dirty region log scan, further data operations and/or metadata operations could be executed on the storage object (file) of interest.

If data operations are executed during the dirty region log scan, then a Push data operation will carry across the latest timestamp. The dirty region log scan will carry across the latest timestamp, which will not be applied since the timestamp being carried across in a message will be no new than the timestamp at the destination inode of the replicated storage object (destination file). If metadata operations are executed on the storage object (source file) during a dirty region log scan, this will be mutually exclusive with the dirty region log induced file system spin network protocol read message (or any other type of read message).

To provide for resynchronization of a synchronous replication relationship, FIG. 1 illustrates an embodiment of a clustered network environment 100 or a network storage environment. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating the clustered network environment 100 that may implement at least some embodiments of the techniques and/or systems described herein. The clustered network environment 100 comprises data storage systems 102 and 104 that are coupled over a cluster fabric 106, such as a computing network embodied as a private Infiniband, Fibre Channel (FC), or Ethernet network facilitating communication between the data storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, In an embodiment a clustered network can be distributed over a plurality of storage systems and/or nodes located in a plurality of geographic locations; while In an embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets, a Storage Area Network (SAN) protocol, such as Small Computer System Interface (SCSI) or Fiber Channel Protocol (FCP), an object protocol, such as S3, etc. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more storage network connections 112, 114.

The nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a node in the clustered network environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the clustered network environment 100, nodes 116, 118 can comprise various functional components that coordinate to provide distributed storage architecture for the cluster. For example, the nodes can comprise network modules 120, 122 and disk modules 124, 126. Network modules 120, 122 can be configured to allow the nodes 116, 118 (e.g., network storage controllers) to connect with host devices 108, 110 over the storage network connections 112, 114, for example, allowing the host devices 108, 110 to access data stored in the distributed storage system. Further, the network modules 120, 122 can provide connections with one or more other components through the cluster fabric 106. For example, in FIG. 1, the network module 120 of node 116 can access a second data storage device by sending a request through the disk module 126 of node 118.

Disk modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, disk modules 124, 126 communicate with the data storage devices 128, 130 according to the SAN protocol, such as SCSI or FCP, for example. Thus, as seen from an operating system on nodes 116, 118, the data storage devices 128, 130 can appear as locally attached to the operating system. In this manner, different nodes 116, 118, etc. may access data blocks through the operating system, rather than expressly requesting abstract files.

It should be appreciated that, while the clustered network environment 100 illustrates an equal number of network and disk modules, other embodiments may comprise a differing number of these modules. For example, there may be a plurality of network and disk modules interconnected in a cluster that does not have a one-to-one correspondence between the network and disk modules. That is, different nodes can have a different number of network and disk modules, and the same node can have a different number of network modules than disk modules.

Further, a host device 108, 110 can be networked with the nodes 116, 118 in the cluster, over the storage networking connections 112, 114. As an example, respective host devices 108, 110 that are networked to a cluster may request services (e.g., exchanging of information in the form of data packets) of nodes 116, 118 in the cluster, and the nodes 116, 118 can return results of the requested services to the host devices 108, 110. In an embodiment, the host devices 108, 110 can exchange information with the network modules 120, 122 residing in the nodes 116, 118 (e.g., network hosts) in the data storage systems 102, 104.

In an embodiment, the data storage devices 128, 130 comprise volumes 132, which is an implementation of storage of information onto disk drives or disk arrays or other storage (e.g., flash) as a file-system for data, for example. In an example, a disk array can include all traditional hard drives, all flash drives, or a combination of traditional hard drives and flash drives. Volumes can span a portion of a disk, a collection of disks, or portions of disks, for example, and typically define an overall logical arrangement of file storage on disk space in the storage system. In an embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the clustered network environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the disk module 124, where the data storage device 128 comprises volume 132A. In this way, in this example, the host device can access the volume 132A, to store and/or retrieve data, using the data storage system 102 connected by the storage network connection 112. Further, in this embodiment, the host device 110 can exchange data with the network module 122 in the node 118 within the data storage system 104 (e.g., which may be remote from the data storage system 102). The node 118 can forward the data to the data storage device 130 using the disk module 126, thereby accessing volume 132B associated with the data storage device 130.

It may be appreciated that replay of metadata and data operations may be implemented within the clustered network environment 100. In an example, operations may be executed at node 116 and replayed at node 118. It may be appreciated that replay of metadata and data operations may be implemented for and/or between any type of computing environment, and may be transferrable between physical devices (e.g., node 116, node 118, a desktop computer, a tablet, a laptop, a wearable device, a mobile device, a storage device, a server, etc.) and/or a cloud computing environment (e.g., remote to the clustered network environment 100).

Figure 2:
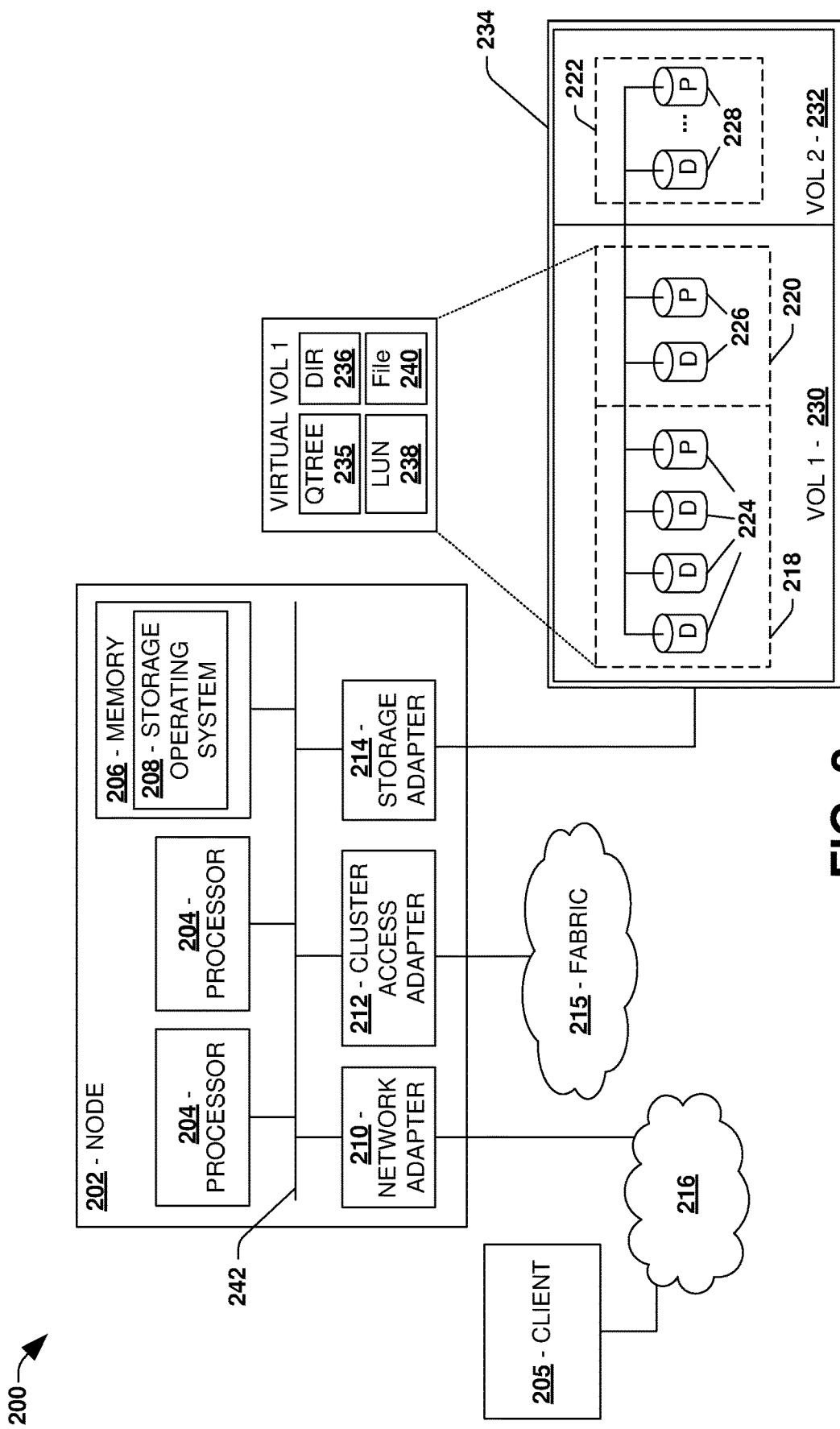
FIG. 2 is a component block diagram illustrating an example data storage system in which an embodiment of the invention may be implemented.

FIG. 2 is an illustrative example of a data storage system 200 (e.g., 102, 104 in FIG. 1), providing further detail of an embodiment of components that may implement one or more of the techniques and/or systems described herein. The data storage system 200 comprises a node 202 (e.g., nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provide access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The data storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software application code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network 216 (and/or returned to another node attached to the cluster over the cluster fabric 215).

In an embodiment, storage of information on disk arrays 218, 220, 222 can be implemented as one or more storage volumes 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In an embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In an embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In an embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the one or more LUNs 238.

It may be appreciated that replay of metadata and data operations may be implemented for the data storage system 200. In an example, the node 202 may execute operation upon an NVRAM and replay the operations to flush the NVRAM to storage. It may be appreciated that replay of metadata and data operations may be implemented for and/or between any type of computing environment, and may be transferrable between physical devices (e.g., node 202, host device 205, a desktop computer, a tablet, a laptop, a wearable device, a mobile device, a storage device, a server, etc.) and/or a cloud computing environment (e.g., remote to the node 202 and/or the host device 205).

Figure 3:
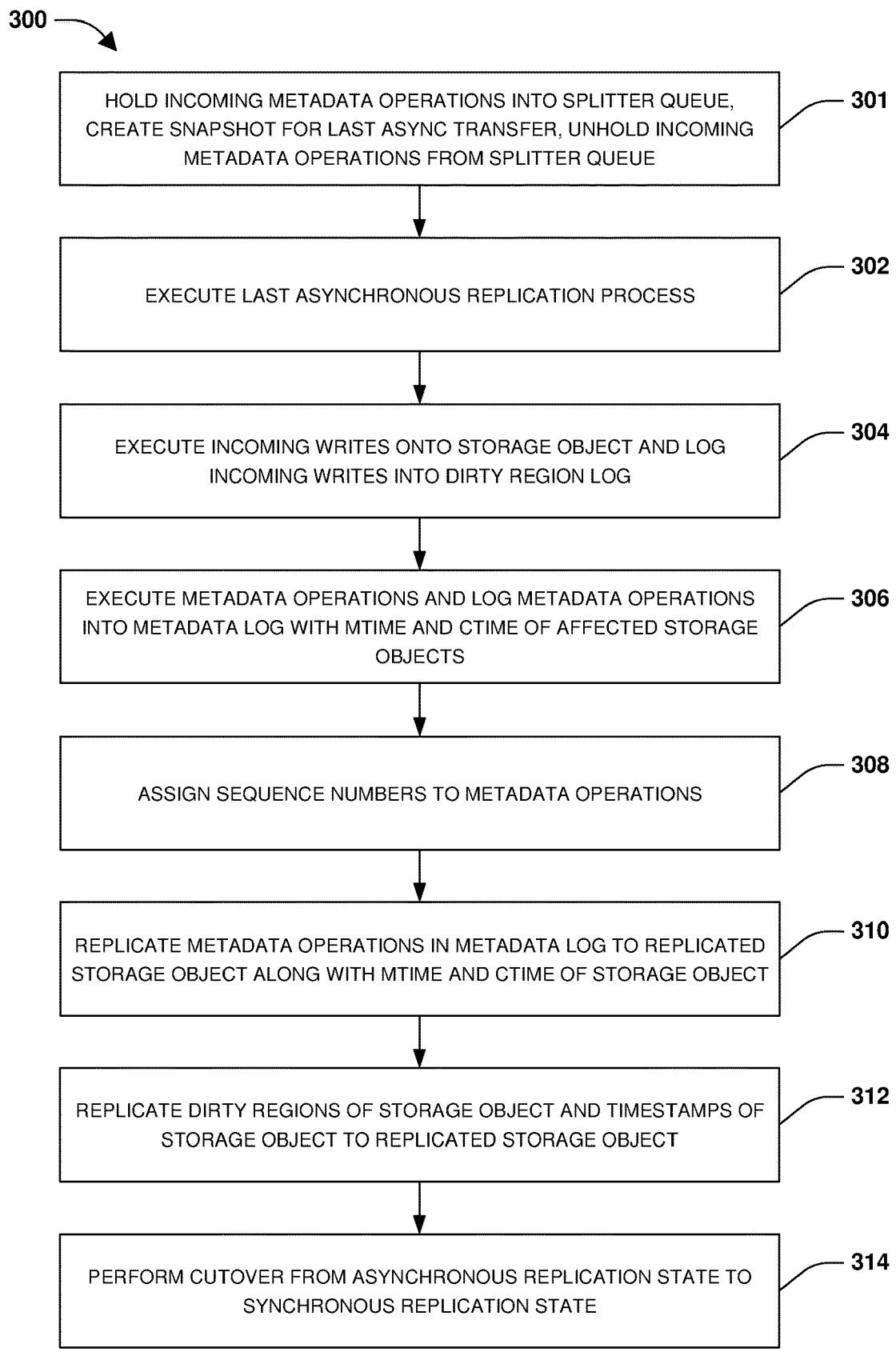
FIG. 3 is a flow chart illustrating an example method for resynchronization of a synchronous replication relationship.
Figure 4:
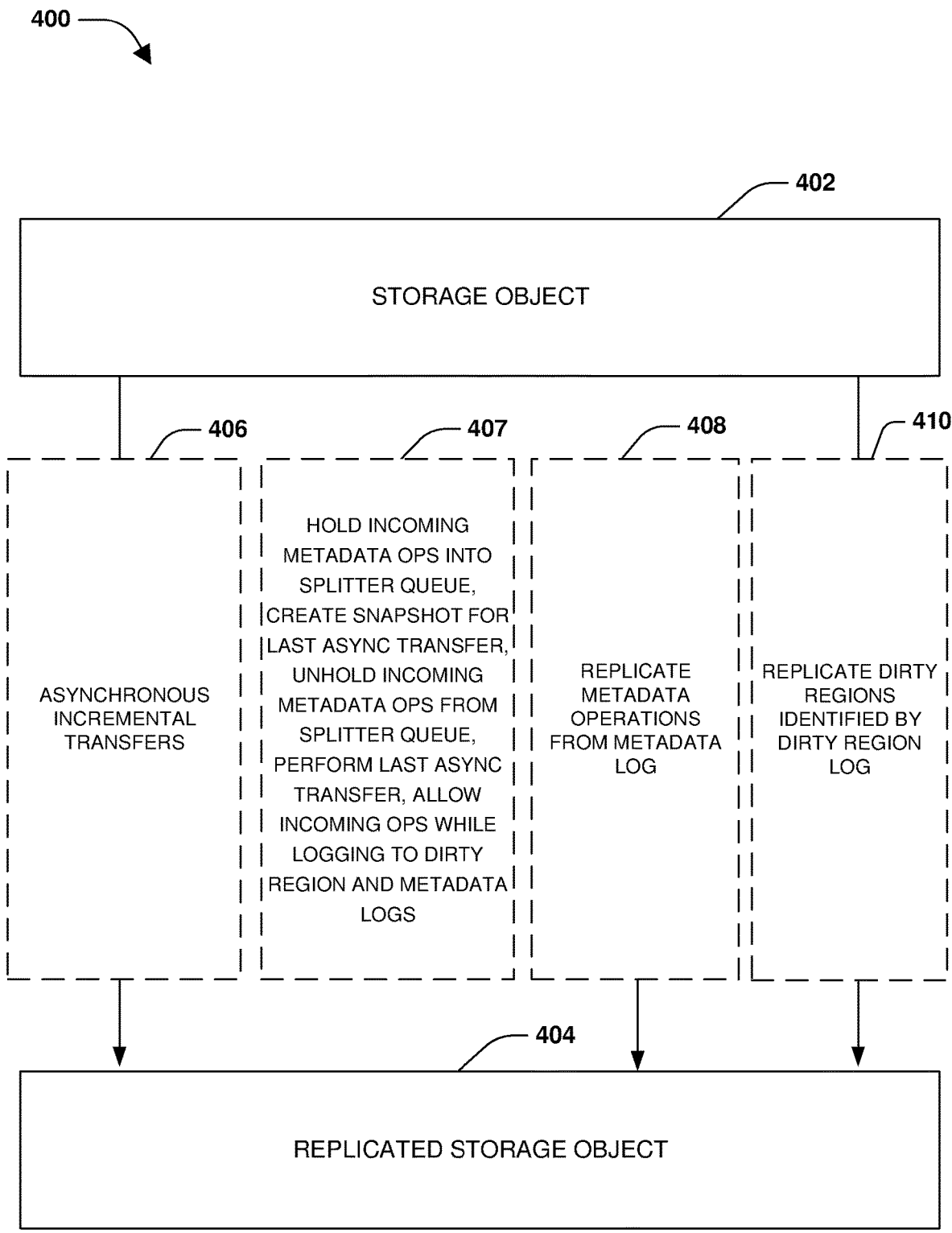
FIG. 4 is a component block diagram illustrating an example system for resynchronization of a synchronous replication relationship.

One embodiment of resynchronization of a synchronous replication relationship is illustrated by an exemplary method 300 of FIG. 3 and further described in conjunction with system 400 of FIG. 4. In an embodiment, a storage object 402 at a first computing environment may have an asynchronous replication relationship with a replicated storage object 404 at a second computing environment. The storage object may correspond to files, directories, a file system, a volume, a storage virtual machine comprising a plurality of volumes hosted across one or more nodes of the first computing environment, etc. In an embodiment, the storage object 402 and the replicated storage object 404 may have the asynchronous replication relationship, a synchronous replication relationship that has become out of sync, or no replication relationship. The, a resynchronization process can be performed to transition the storage object 402 and the replicated storage object 404 into a synchronous replication state.

At 301, a snapshot creation operation 407 is performed in preparation for a subsequent last asynchronous incremental transfer that is part of the resynchronization process. In particular, incoming metadata operations are held (e.g., inserted) into a splitter queue. The splitter queue may be associated with a splitter object configured to split (replicate) operations targeting the storage object 402 to the second computing environment for commitment to the replicated storage object 404. A snapshot of the storage object 402 is created for the last asynchronous incremental transfer. Once the snapshot is created, the incoming metadata operations are dequeued from the splitter queue. The last asynchronous replication is performed. Incoming operations are allow onto the storage object 402, and are logged into the dirty region log and the metadata log. In an embodiment, the snapshot creation operation 407 is performed before, during, or after an asynchronous incremental transfer 460.

At 302, an asynchronous replication process is executed to perform asynchronous incremental transfers 406 of data from the storage object 402 to the replicated storage object 404. For example, an asynchronous incremental transfer may transfer delta data of the storage object 402 between when a first snapshot of the storage object 402 was created and when a subsequent second snapshot of the storage object 402 was created. The delta data is identified by comparing the first snapshot and the second snapshot to identify differences in data between the first snapshot and the second snapshot as the delta data. The asynchronous incremental transfers 406 include the last asynchronous incremental transfer that is associated with the snapshot created by the snapshot creation operation 401.

Performing the asynchronous incremental transfer to replicate the delta data from the storage object 402 into the replicated storage object 404 helps bring the replicated storage object 404 closer to a state of having the same data as the storage object 402. However, the delta data only corresponds to differences between the storage object 402 and the replicated storage object 404 at a point in time when the second snapshot was created. Thus, the storage object 402 could be further modified by data and/or metadata modification operations executed after the second snapshot was created. Accordingly, as will be described in further detail, a dirty region log and a metadata log are used to track these data operations and metadata operations executed after the second snapshot was created and/or to track new/different data and metadata created by the operations for replication to the replicated storage object 404.

At 304, incoming write operations targeting the storage object 402 are logged into the dirty region log. The incoming write operations are logged during a last asynchronous incremental transfer. For example, the dirty region log comprises a bitmap with bits corresponding to regions of the storage object 402. A bit for a region can be set to a first value to indicate that the region has not been modified by a write operation (e.g., the region comprises data that is the same as data within a corresponding region of the replicated storage object 404) or a second value to indicate that the region is now a dirty region with dirty data based upon a write operation modifying the region (e.g., the "dirty" region comprises data that has not yet been replicated to the replicated storage object 404, and thus the dirty region comprises data that is different than data stored within a corresponding region within the replicated storage object 404). Thus, when a write operation is executed upon the storage object 402 during the last asynchronous incremental transfer, bits corresponding to regions that are modified by the write operation are set to the second value to indicate that those are now dirty regions with modified data not yet replicated to the replicated storage object 402.

In an embodiment, a signature is associated with (assigned to) the write operation to indicate that the write operation is accounted for by the dirty region log. The signature may comprise a predefined signature shared with a file system hosting the storage object 402 or a calculated signature dynamically determined based upon various factors (e.g., a hash of data to be written by the write operation) that can also be calculated by the file system. In an embodiment, the write operation is intercepted above the file system (e.g., within a layer of a storage stack above an operation system) where the dirty region log is being implemented, and thus can be assigned the signature before being forwarded to the file system (e.g., to the operating system). The file system hosting the storage object 402 is configured to fail write operations that do not have signatures assigned to the write operations. This is because such write operations, lacking signatures, were not accounted for and tracked by the dirty region log. If the file system would execute these write operations that are not accounted for by the dirty region log, then modifications by the write operations (dirty data in the storage object 402 not yet replicated to the replicated storage object 404) would not be replicated to the replicated storage object 404 when the dirty region log is used for replicating dirty data of dirty regions within the storage object 402 because the dirty region log never accounted for and tracked the write operations. Furthermore, a signature is associated with (assigned to) metadata operations to indicate that the metadata operations will be accounted for by the metadata operation log. The file system will fail metadata operations that do not have assigned signatures.

At 306, metadata operations, executed on the storage object 402, are logged into a metadata log during the last asynchronous incremental transfer. The metadata operations may comprise a create operation (e.g., a create file operation, a create LUN operation, etc.), a link operation, an unlink operation, a rename operation (e.g., a file rename operation, etc.), a set attribute operation (e.g., a file resize operation), etc. The metadata operations are logged into the metadata log by inserting the metadata operations into the metadata log. At 308, sequences numbers are assigned to the metadata operations in the metadata log based upon an order of execution of the metadata operations. In an embodiment, metadata operations may be sorted within the metadata log based upon the sequence numbers. In an embodiment, the metadata operations are inserted into the metadata log based upon the sequence numbers. In an embodiment, the metadata log comprises a queue. The metadata operations are logged into the queue according to the assigned sequence numbers or are sorted within the queue based upon the assigned sequence numbers. In this way, metadata operations executed on the storage object 402 are tracked for subsequent replication to the replicated storage object 402.

At 310, the metadata operations in the metadata log are replicated 408 to the second storage environment hosting the replicated storage object 404 for execution upon the replicated storage object 404 in an order according to the sequences numbers. Also, mtime (e.g., modification time where contents of the storage object have been modified) and ctime (e.g., change time where content or attributes of the storage object have been changed) of the storage object 402 are replicated. That is, the metadata operations will be executed upon the replicated storage object 404 by the second computing environment according to the same order the metadata operations were executed upon the storage object 402 by the first computing environment. In one embodiment, incoming metadata operations are held from being executed (e.g., blocked, failed, queued for subsequent execution, etc.) until a snapshot can be created for the last asynchronous incremental transfer. That is, a snapshot of the storage object 402 is created as part of the last asynchronous incremental transfer to capture of a current state of the storage object 402. Holding incoming metadata operations from being executed upon the storage object 402 avoids metadata operations getting captured in both the metadata log (e.g., execution of the incoming metadata operations would be captured in the metadata log for subsequent replication to the replicated storage object 404) and the snapshot.

In one embodiment, timestamp changes for the storage object 402 are logged into the metadata log. The timestamp changes can correspond to a time value change for a create time (e.g., a time at which a file is created), a status change time of a file or directory, a data change time (e.g., a time at which a file was last modified), etc. The timestamp changes are replicated to the replicated storage object 404 using the metadata log.

At 312, dirty regions of the storage object 402, as identified by the dirty region log, are replicated 410 to the replicated storage object 404. In one embodiment, the dirty regions are replicated 410 after metadata operations within the metadata log are finished being replicated 408 upon the replicated storage object 404. That is, completion of the replication 408 of the metadata operations within the metadata log triggers the start of replicating 410 the dirty data within the dirty regions (e.g., dirty data not yet replicated from the storage object 402 to the replicated storage object 404 because the dirty data was written to the storage object 402 by data operations, such as write operations, occurring after the last asynchronous replication transfer).

During the replication 410 of the dirty regions, incoming write operations, targeting the storage object 402, are processed on a case by case basis. Write operations targeting non-dirty regions (e.g., regions having bits set to the first value indicating that such regions have not been modified by write operations since the start of logging incoming write operations using the dirty region log) are executed upon the storage object 402 and are directly replicated and executed upon the replicated storage object 404. Write operations targeting dirty regions are executed only upon the storage object 402 and are logged into the dirty region log so that the dirty region log can be used to subsequently replicate those changes by the write operations to the replicated storage object 404. Portions of the dirty region log that would be rendered invalid due to subsequently executed metadata operations are not replicated to the replicated storage object 404.

The present system improves upon existing techniques for establishing or reestablishing a synchronous replication relationship between storage objects because client I/O is not held (e.g., blocked, failed, stopped, or queued for later execution) during the transition to a synchronous replication state. Instead, the dirty region log and the metadata log are used to track and replicate such client I/O such as data operations and metadata operation executed upon the storage object 402. In this way, the present system establishes the synchronous replication state in a non-disruptive manner that reduces latency that would otherwise occur if the client I/O was held.

Figure 5:
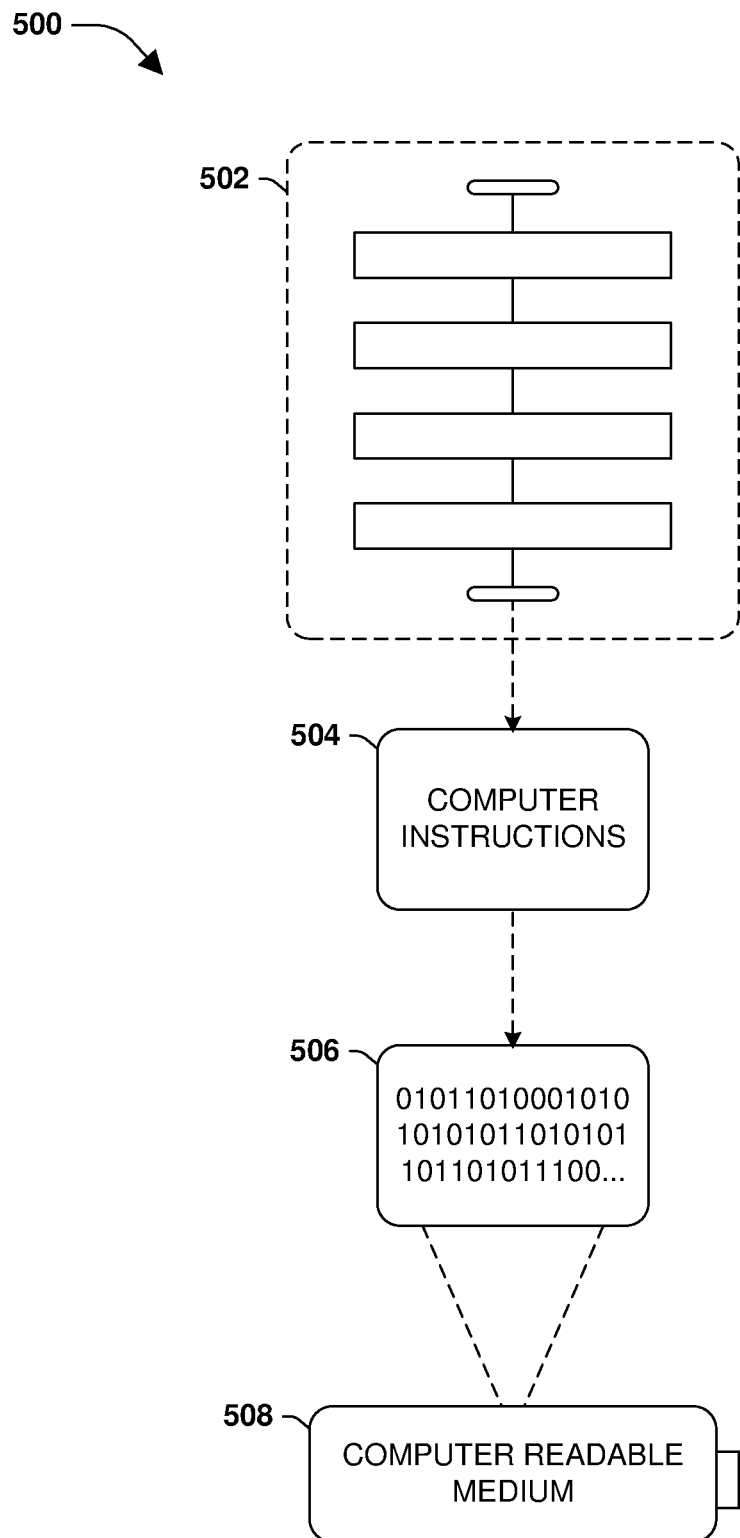
FIG. 5 is an example of a computer readable medium in which an embodiment of the invention may be implemented.

Still another embodiment 500 involves a computer-readable medium comprising processor-executable instructions configured to implement one or more of the techniques presented herein. An example embodiment of a computer-readable medium or a computer-readable device that is devised in these ways is illustrated in FIG. 5, wherein the implementation comprises a computer-readable medium 508, such as a compact disc-recordable (CD-R), a digital versatile disc-recordable (DVD-R), flash drive, a platter of a hard disk drive, etc., on which is encoded computer-readable data 506. This computer-readable data 506, such as binary data comprising at least one of a zero or a one, in turn comprises a processor-executable computer instructions 504 configured to operate according to one or more of the principles set forth herein. In some embodiments, the processor-executable computer instructions 504 are configured to perform a method 502, such as at least some of the exemplary method 300 of FIG. 3, for example. In some embodiments, the processor-executable computer instructions 504 are configured to implement a system, such as at least some of the exemplary system 400 of FIG. 4, for example. Many such computer-readable media are contemplated to operate in accordance with the techniques presented herein.

Figure 6:
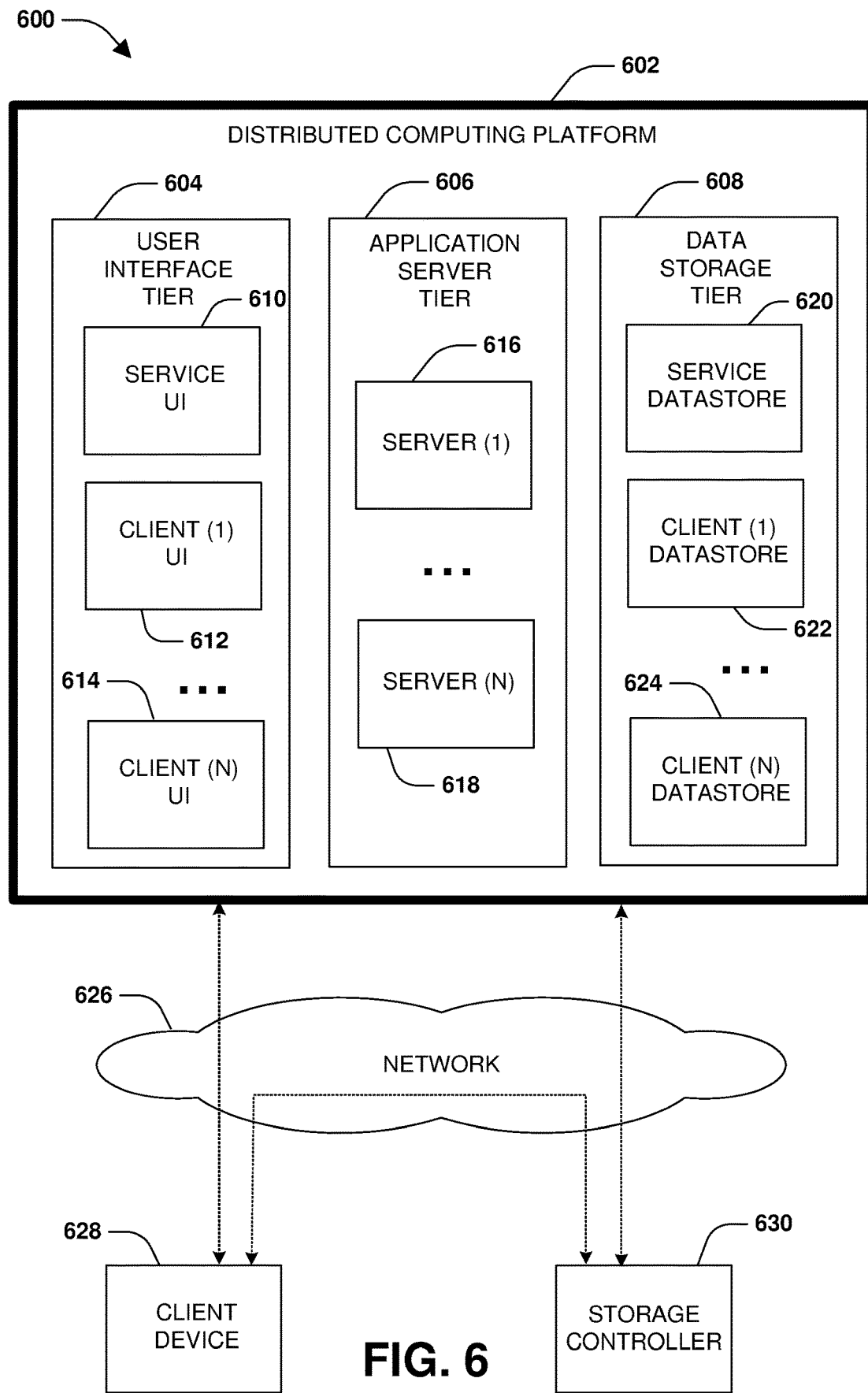
FIG. 6 is a component block diagram illustrating an example computing environment in which an embodiment of the invention may be implemented.

FIG. 6 is a diagram illustrating an example operating environment 600 in which an embodiment of the techniques described herein may be implemented. In one example, the techniques described herein may be implemented within a client device 628, such as a laptop, tablet, personal computer, mobile device, wearable device, etc. In another example, the techniques described herein may be implemented within a storage controller 630, such as a node configured to manage the storage and access to data on behalf of the client device 628 and/or other client devices. In another example, the techniques described herein may be implemented within a distributed computing platform 602 such as a cloud computing environment (e.g., a cloud storage environment, a multi-tenant platform, etc.) configured to manage the storage and access to data on behalf of the client device 628 and/or other client devices.

In yet another example, at least some of the techniques described herein are implemented across one or more of the client device 628, the storage controller 630, and the distributed computing platform 602. For example, the client device 628 may transmit operations, such as data operations to read data and write data and metadata operations (e.g., a create file operation, a rename directory operation, a resize operation, a set attribute operation, etc.), over a network 626 to the storage controller 630 for implementation by the storage controller 630 upon storage. The storage controller 630 may store data associated with the operations within volumes or other data objects/structures hosted within locally attached storage, remote storage hosted by other computing devices accessible over the network 626, storage provided by the distributed computing platform 602, etc. The storage controller 630 may replicate the data and/or the operations to other computing devices so that one or more replicas, such as a destination storage volume that is maintained as a replica of a source storage volume, are maintained. Such replicas can be used for disaster recovery and failover.

The storage controller 630 may store the data or a portion thereof within storage hosted by the distributed computing platform 602 by transmitting the data to the distributed computing platform 602. In one example, the storage controller 630 may locally store frequently accessed data within locally attached storage. Less frequently accessed data may be transmitted to the distributed computing platform 602 for storage within a data storage tier 608. The data storage tier 608 may store data within a service data store 620, and may store client specific data within client data stores assigned to such clients such as a client (1) data store 622 used to store data of a client (1) and a client (N) data store 624 used to store data of a client (N). The data stores may be physical storage devices or may be defined as logical storage, such as a virtual volume, LUNs, or other logical organizations of data that can be defined across one or more physical storage devices. In another example, the storage controller 630 transmits and stores all client data to the distributed computing platform 602. In yet another example, the client device 628 transmits and stores the data directly to the distributed computing platform 602 without the use of the storage controller 630.

The management of storage and access to data can be performed by one or more storage virtual machines (SVMs) or other storage applications that provide software as a service (SaaS) such as storage software services. In one example, an SVM may be hosted within the client device 628, within the storage controller 630, or within the distributed computing platform 602 such as by the application server tier 606. In another example, one or more SVMs may be hosted across one or more of the client device 628, the storage controller 630, and the distributed computing platform 602.

In one example of the distributed computing platform 602, one or more SVMs may be hosted by the application server tier 606. For example, a server (1) 616 is configured to host SVMs used to execute applications such as storage applications that manage the storage of data of the client (1) within the client (1) data store 622. Thus, an SVM executing on the server (1) 616 may receive data and/or operations from the client device 628 and/or the storage controller 630 over the network 626. The SVM executes a storage application to process the operations and/or store the data within the client (1) data store 622. The SVM may transmit a response back to the client device 628 and/or the storage controller 630 over the network 626, such as a success message or an error message. In this way, the application server tier 606 may host SVMs, services, and/or other storage applications using the server (1) 616, the server (N) 618, etc.

A user interface tier 604 of the distributed computing platform 602 may provide the client device 628 and/or the storage controller 630 with access to user interfaces associated with the storage and access of data and/or other services provided by the distributed computing platform 602. In an example, a service user interface 610 may be accessible from the distributed computing platform 602 for accessing services subscribed to by clients and/or storage controllers, such as data replication services, application hosting services, data security services, human resource services, warehouse tracking services, accounting services, etc. For example, client user interfaces may be provided to corresponding clients, such as a client (1) user interface 612, a client (N) user interface 614, etc. The client (1) can access various services and resources subscribed to by the client (1) through the client (1) user interface 612, such as access to a web service, a development environment, a human resource application, a warehouse tracking application, and/or other services and resources provided by the application server tier 606, which may use data stored within the data storage tier 608.

The client device 628 and/or the storage controller 630 may subscribe to certain types and amounts of services and resources provided by the distributed computing platform 602. For example, the client device 628 may establish a subscription to have access to three virtual machines, a certain amount of storage, a certain type/amount of data redundancy, a certain type/amount of data security, certain service level agreements (SLAs) and service level objectives (SLOs), latency guarantees, bandwidth guarantees, access to execute or host certain applications, etc. Similarly, the storage controller 630 can establish a subscription to have access to certain services and resources of the distributed computing platform 602.

As shown, a variety of clients, such as the client device 628 and the storage controller 630, incorporating and/or incorporated into a variety of computing devices may communicate with the distributed computing platform 602 through one or more networks, such as the network 626. For example, a client may incorporate and/or be incorporated into a client application (e.g., software) implemented at least in part by one or more of the computing devices.

Examples of suitable computing devices include personal computers, server computers, desktop computers, nodes, storage servers, storage controllers, laptop computers, notebook computers, tablet computers or personal digital assistants (PDAs), smart phones, cell phones, and consumer electronic devices incorporating one or more computing device components, such as one or more electronic processors, microprocessors, central processing units (CPU), or controllers. Examples of suitable networks include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing platform 602, such as a multi-tenant business data processing platform or cloud computing environment, may include multiple processing tiers, including the user interface tier 604, the application server tier 606, and a data storage tier 608. The user interface tier 604 may maintain multiple user interfaces, including graphical user interfaces and/or web-based interfaces. The user interfaces may include the service user interface 610 for a service to provide access to applications and data for a client (e.g., a "tenant") of the service, as well as one or more user interfaces that have been specialized/customized in accordance with user specific requirements, which may be accessed via one or more APIs.

The service user interface 610 may include components enabling a tenant to administer the tenant's participation in the functions and capabilities provided by the distributed computing platform 602, such as accessing data, causing execution of specific data processing operations, etc. Each processing tier may be implemented with a set of computers, virtualized computing environments such as a storage virtual machine or storage virtual server, and/or computer components including computer servers and processors, and may perform various functions, methods, processes, or operations as determined by the execution of a software application or set of instructions.

The data storage tier 608 may include one or more data stores, which may include the service data store 620 and one or more client data stores. Each client data store may contain tenant-specific data that is used as part of providing a range of tenant-specific business and storage services or functions, including but not limited to ERP, CRM, eCommerce, Human Resources management, payroll, storage services, etc. Data stores may be implemented with any suitable data storage technology, including structured query language (SQL) based relational database management systems (RDBMS), file systems hosted by operating systems, object storage, etc.

In accordance with one embodiment of the invention, the distributed computing platform 602 may be a multi-tenant and service platform operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information or any other type of information.

In an embodiment, the described methods and/or their equivalents may be implemented with computer executable instructions. Thus, In an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
    asynchronously transferring data of a storage object of a first node to a replicated storage object at a second node;
    logging metadata operations executed upon the storage object into a metadata log according to an order of execution of the metadata operations being executed;
    selectively logging timestamp changes due to the metadata operations into the metadata log and refraining from logging timestamps changes due to write operations into a dirty region log used to track dirty data written by the write operations;
    replicating the timestamp changes and the metadata operations from the metadata log to the replicated storage object according to the order of execution;
    reading latest timestamps from an active file system of the first node; and
    replicating modified data of the storage object and the latest timestamps to the replicated storage object after the metadata operations have been replicated, wherein the latest timestamps are conditionally applied only if the latest timestamps are higher than timestamps in inodes of the replicated storage object, wherein the replicating the modified data comprises:
        determining that a consistency issue will occur from replicating the modified data based upon a determination that a metadata operation on the storage object occurred subsequent a write operation on the storage object, wherein the metadata operation is determined to invalidate a portion of the dirty region log based upon the metadata operation either deleting or truncating the storage object; and
        replicating remaining modified data corresponding to a remainder of valid content of the dirty region log and ignoring the consistency issue.

2. The method of claim 1, comprising:
    assigning sequence numbers to the metadata operations within the metadata log based upon the order of execution.

3. The method of claim 1, comprising:
    in response to the dirty region log indicating that a write operation targets a dirty region of the storage object, executing the write operation upon the storage object and refraining from replicating the write operation upon to the replicated storage object, otherwise executing the write operation upon the storage object and replicating the write operation to the replicated storage object based upon the write operation targeting a non-dirty region or partially dirty region.

4. The method of claim 1, wherein the metadata log is a queue within which the metadata operations are ordered based upon sequence numbers assigned to the metadata operations.

5. The method of claim 1, wherein the modified data is tracked as dirty regions within the dirty region log based upon incoming the write operations modifying the dirty regions.

6. The method of claim 5, wherein the replicating modified data comprises:
    executing operations upon the storage object and the replicated storage object based upon the operations corresponding to non-dirty regions of unmodified data.

7. The method of claim 5, wherein the replicating modified data comprises:
    skipping portions of the dirty region log that are rendered invalid due to subsequently executed metadata operations.

8. The method of claim 5, wherein the replicating modified data comprises:
    executing operations upon the storage object and refraining from replicating the operations to the replicated storage object based upon the operations corresponding to dirty regions identified by the dirty region log.

9. The method of claim 1, wherein metadata operations accounted for by the metadata log are assigned a signature.

10. The method of claim 9, comprising:
failing metadata operations without the signature.

11. The method of claim 1, comprising:
queuing incoming metadata operations until a snapshot is created for a last asynchronous incremental transfer.

12. The method of claim 1, comprising:
transitioning to a synchronous replication state based upon the modified data being replicated to the replicated storage object.

13. The method of claim 12, wherein the synchronous replication state corresponds to where incoming operations targeting the storage object are synchronously replicated to the replicated storage object.

14. A non-transitory machine readable medium comprising instructions for performing a method, which when executed by a machine, causes the machine to:
asynchronously transfer data of a storage object of a first node to a replicated storage object at a second node;
log metadata operations executed upon the storage object into a metadata log according to an order of execution of the metadata operations being executed;
selectively log timestamp changes due to the metadata operations into the metadata log and refraining from logging timestamps changes due to write operations into a dirty region log used to track dirty data written by the write operations;
replicate the timestamp changes and the metadata operations from the metadata log to the replicated storage object according to the order of execution;
read latest timestamps from an active file system of the first node; and
replicate modified data of the storage object and the latest timestamps to the replicated storage object after the metadata operations have been replicated, wherein the latest timestamps are conditionally applied only if the latest timestamps are higher than timestamps in inodes of the replicated storage object, comprising:
determining that a consistency issue will occur from replicating the modified data based upon a determination that a metadata operation on the storage object occurred subsequent a write operation on the storage object, wherein the metadata operation is determined to invalidate a portion of the dirty region log based upon the metadata operation either deleting or truncating the storage object; and
replicating remaining modified data corresponding to a remainder of valid content of the dirty region log and ignoring the consistency issue.

15. The non-transitory machine readable medium of claim 14, wherein the modified data is tracked as dirty regions within the dirty region log based upon incoming the write operations modifying the dirty regions.

16. The non-transitory machine readable medium of claim 15, wherein the instructions cause the machine to:
execute operations upon the storage object and the replicated storage object based upon the operations corresponding to non-dirty regions of unmodified data.

17. The non-transitory machine readable medium of claim 15, wherein the instructions cause the machine to:
skip portions of the dirty region log that are rendered invalid due to subsequently executed metadata operations.

18. The non-transitory machine readable medium of claim 15, wherein the instructions cause the machine to:
execute operations upon the storage object and refraining from replicating the operations to the replicated storage object based upon the operations corresponding to dirty regions identified by the dirty region log.

19. A computing device comprising:
a memory comprising machine executable code for performing a method; and
a processor coupled to the memory, the processor configured to execute the machine executable code to cause the processor to:
asynchronously transfer data of a storage object of a first node to a replicated storage object at a second node;
log metadata operations executed upon the storage object into a metadata log according to an order of execution of the metadata operations being executed;
selectively log timestamp changes due to the metadata operations into the metadata log and refraining from logging timestamps changes due to write operations into a dirty region log used to track dirty data written by the write operations;
replicate the timestamp changes and the metadata operations from the metadata log to the replicated storage object according to the order of execution;
read latest timestamps from an active file system of the first node; and
replicate modified data of the storage object and the latest timestamps to the replicated storage object after the metadata operations have been replicated, wherein the latest timestamps are conditionally applied only if the latest timestamps are higher than timestamps in inodes of the replicated storage object, comprising:
determining that a consistency issue will occur from replicating the modified data based upon a determination that a metadata operation on the storage object occurred subsequent a write operation on the storage object, wherein the metadata operation is determined to invalidate a portion of the dirty region log based upon the metadata operation either deleting or truncating the storage object; and
replicating remaining modified data corresponding to a remainder of valid content of the dirty region log and ignoring the consistency issue.

20. The computing device of claim 19, wherein the machine executable code causes the processor to:
transition to a synchronous replication state based upon the modified data being replicated to the replicated storage object.

* * * * *